Sept. 21, 1965  A. SAFFER  3,207,700
SILVER OXIDATION CATALYST AND CATALYST SUPPORT STRUCTURE
Filed March 24, 1960
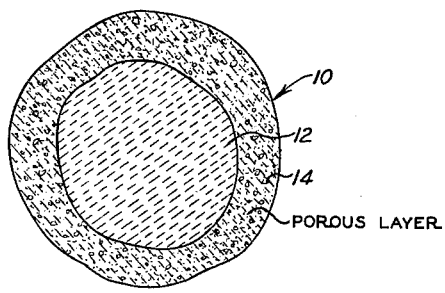
INVENTOR
ALFRED SAFFER
BY
ATTORNEY United States Patent Office 3,207,700
Patented Sept. 21, 1965

3,207,700
SILVER OXIDATION CATALYST AND CATALYST SUPPORT STRUCTURE
Alfred Saffer, Bayside, N.Y., assignor to Halcon International, Inc., a corporation of Delaware
Filed Mar. 24, 1960, Ser. No. 17,430
4 Claims. (Cl. 252—443)

This invention relates to an improved catalyst, and more particularly a cored impregnated catalyst for the manufacture of ethylene oxide, and a process for the production of ethylene oxide utilizing said improved catalyst.

In the direct air oxidation of ethylene to ethylene oxide, silver containing catalysts have been employed successfully on a commercial scale. These catalysts generally consist of a catalysts support having thereon a thin coating of minute particles of silver metal. One of the disadvantages of such coated catalysts is the relatively weak cohesive property of the silver particles and the relatively weak adhesion between the silver coating and catalyst support. Over an extended period of operation these weaknesses are manifested by loss of a portion of the silver coating through attrition, and consequently a reduction in catalyst activity.

Heretofore, attempts to more strongly bond the catalyst coating to the catalyst support have resulted in reduced catalyst efficiency. Impregnation of catalyst material into the pores of the catalyst support results in a high strength catalyst structure in which the silver loss by attrition is relatively low. However, the selectivity of impregnated catalysts is generally less than that of coated catalysts.

It is, therefore, an important object of the present invention to provide an improved impregnated catalyst for the manufacture of ethylene oxide which exhibits efficiencies approximately as good as or better than coated catalysts.

Another object of the present invention is to provide an improved impregnated catalyst having a core structure which is less porous than the remaining catalyst support.

Another object is to provide an improved impregnated catalyst comprising a porous coating bonded to a non-porous surface, in which the impregnated catalyst material is distributed substantially in the porous coating.

Another object is to provide an improved process for producing ethylene oxide by the oxidation of ethylene utilizing an improved impregnated catalyst.

Other objects, features and advantages of the present invention will be apparent from the following detailed description of a preferred embodiment thereof, taken in conjunction with the drawing in which:

The single figure is a cross sectional view of an impregnated catalyst illustrating the features and principles of the present invention.

The above objects are accomplished in the present invention by utilizing as the catalyst support a porous layer or coating which is bonded to a non-porous or substantially gas impermeable surface. Preferably, the catalyst support is a composite catalyst support comprising the combination of a relatively non-porous or low porosity core structure of particulate form and a porous surrounding layer of minute separate particles bonded thereto. Upon impregnation of the composite catalyst support, the impregnated catalyst material will tend to be distributed in the outer porous layer, with little or substantially no impregnation of the less porous core. Accordingly, a composite catalyst support 10 embodying the principles of the present invention may comprise a porous or outer margin 14 which is suitably bonded to a relatively gas-impermeable surface, such as the surface of a substantially non-porous core structure 12.

According to the present invention, the core structure 12 may comprise one or more concentrically disposed cores, a single core being preferred and illustrated in the present instance.

The core structure 12 of the invention comprises a low porosity refractory material, preferably alumina particles which are bonded or fused to produce a high density, low porosity mass having a substantially non-porous or gas impermeable surface. Other materials, such as silicon carbide or magnesia or any combination thereof, may also be used, so long as such material is chemically compatible with the catalyst material. The core 12 may be of any suitable configuration, a sphere-shaped core being preferred and illustrated herein.

The outer margin 14 of the composite catalyst support 10 comprises a layer or coating of support particles, which coating is bonded to the nonporous surface of the core structure 12. The support particles used in the composite catalyst support should be a material which may be produced in fine particle sizes. It should not pack down excessively when coated onto the non-porous surface of the core structure 12, in order to provide a sufficiently porous outer margin which will allow a gas to permeate quickly therethrough. It should be possessed of the requisite adhesive and cohesive properties to impart high mechanical strength to the outer margin.

Among the materials which provide excellent coatings on the core structure are silica, silicates, such as perlite, alumina, magnesia, and other similar metallic oxides or combinations thereof, silica particles being preferred.

It should be understood that while the composite catalysts support of the present invention comprises two or more component ingredients, it is entirely possible for the core structure and the outer margin to have the same chemical composition, though widely varying physical properties, particularly with respect to porosity. This is to be distinguished from the prior art single component catalyst support material having uniform chemical and physical characteristics throughout.

The range of porosity in the outer margin may be from about 15 to 40%, desirably about 20 to 30%, and preferably about 25% to 30%. Usually, in the core structure, a porosity less than about 10% is desirable, and for best operation a porosity of 0% is preferred.

The thickness of the outer margin may vary between about $1/32''$ and $1/2''$. A thickness between about $1/16''$ and $1/4''$ is desirable, with $1/16''$ to $1/8''$ being preferred.

Impregnation of the composite catalyst support results in an improved impregnated catalyst having improved distribution therein of the catalyst material. There is little or no penetration into the low porosity core. The result is a cored impregnated catalyst having a core of low porosity and light catalyst penetration and an outer margin of high porosity and heavy catalyst penetration.

A principal advantage residing in the use of the composite catalyst support of the present invention is that it is possible to employ a decreased amount of impregnated catalyst material without necessarily sacrificing the benefits of catalyst efficiency or longevity. For example, in the case of a silver catalyst for the production of ethylene oxide, the weight percent silver content in the impregnated cored catalyst of the invention may vary between about 5% and 15%, desirably between about 7% and 14.5%, and preferably between about 8% and 14%. Optimum yields are obtained when the silver constant is between about 9% and 12%.

As previously stated, preferably the impregnated catalyst material present in the impregnated catalyst should be substantially in the outer margin 12. However, satisfactory results are obtained if the core 14 is lightly penetrated with catalyst material in amounts up to 10%, of that found in the remaining catalyst support.

The catalyst support of the invention may be made by spray coating the low porosity core with high porosity material, drying, and firing. However, other suitable methods of fabrication may be employed, if so desired.

In order to indicate still more fully the nature of the present invention, the following examples of typical procedures are set forth, in which parts and percent are by weight unless otherwise indicated. It is to be understood that these examples are presented in connection with the preparation of ethylene oxide for illustrative purposes only and they are not intended to limit the scope of the invention.

EXAMPLE

A composite catalyst support, made by coating alumina particles on a non-porous alumina core, measures 3/16″ inner core, 1/16″ thick outer margin and 5/16″ outside diameter. The composite catalyst support has the following physical properties:

|  | Percent |
|---|---|
| Porosity, outer shell | 28 |
| Porosity, core structure | 0 |
| Pore size distribution in outer shell: | |
| >70 microns | 0 |
| 60–70 microns | 2.4 |
| 50–60 microns | 0 |
| 37–50 microns | 2.3 |
| 10–37 microns | 2.4 |
| 3–10 microns | 9.5 |
| 2–3 microns | 21.4 |
| 1–2 microns | 59.6 |
| 0.6–1 micron | 2.4 |
| Total | 100.0 |
| Surface area of porous shell (by nitrogen adsorption) | <1 sq. m./gm. |

The composite catalyst support is impregnated in one or more impregnation cycles. Each impregnation cycle involves three steps (1) impregnation of the carrier in an aqueous silver salt solution (2) drying of the treated spheres (3) activation of the dried impregnated support.

A. *Impregnation*

The catalyst support spheres are heated to 100° C. and then immersed in a 55% aqueous solution of silver lactate, preheated to 90° C. After a 15 minute soaking time, the spheres are drained with periodic mixing for a period of 15 minutes.

B. *Drying*

The drained spheres are placed in a stainless steel wire basket and dried at a temperature of 60° C. for 15–18 hours.

C. *Activation*

The dried spheres are placed in a furnace preheated to 70° C. and are heated slowly—over a period of three hours with a temperature increase of approximately 60° C. per hour—to a maximum temperature of 250° C. and then maintained at this temperature for 1 hour. After cooling to 100° C., additional impregnation cycles are conducted as mentioned above, except that the impregnation or soaking time of the spheres in the silver lactate solution is reduced to 5 min. for subsequent impregnations.

The activated, impregnated, composite catalyst support is tested under identical conditions with (a) a hand coated catalyst, and (b) an impregnated catalyst having a homogeneous, porous catalyst support.

The test reactor is a stainless steel reactor tube, 22.1 mm. inside diameter, 60 inches in length, and jacketed with a heat exchange liquid (Tetralin) which can be heated externally with electrically heated wires. Approximately 8 inches of the reactor tube extend beyond the extremities of the jacket. Catalyst support spheres of 5/16″ diameter are placed in the lower part of the reactor tube to a height extending 6″ inside the jacketed portion thereof. The support spheres are covered with a bed of catalyst material corresponding to 75 cm. of reactor tube length. The remainder of the reactor tube is filled with catalyst supports. The temperature of the reactor is raised to 244° C. and a mixture of gases is admitted therethrough at a rate of 186 liters per hour. Analysis of the feed gas is as follows:

|  | Percent |
|---|---|
| $CO_2$ | 6.5 |
| Ethylene | 5.0 |
| Ethane | 0.5 |
| Oxygen | 6.0 |
| Nitrogen | Balance |

During the first hour of operation, approximately 25 p.p.m. of inhibitor, ethylene dichloride, is added along with the feed gas. Thereafter approximately 6 p.p.m. of inhibitor is added.

There are obtained the indicated amounts of ethylene oxide.

*Table I*

ACTIVITY OF IMPREGNATED CATALYST VS. COATED CATALYST

|  | Percent Ag in Catalyst | Percent Ethylene Oxide | Percent Selectivity | Percent Attrition of of Catalyst |
|---|---|---|---|---|
| Hand coated catalyst | 14.04 | 0.70 | 70.0 | 0.4 |
| Impregnated cored catalyst (low porosity core) | 11.54 | 0.72 | 70.8 | Negligible. |
| Impregnated catalyst (homogeneous high porosity catalyst support) | 9.89 | 0.19 | 64.5 | Do. |
| Do | 14.83 | 0.51 | 71.4 | Do. |
| Do | 18.05 | 0.19 | 75.9 | Do. |

From the foregoing results it will be seen that the impregnated cored catalyst of the present invention combines the highly selectivity of the coated catalyst and the attrition resistance of the impregnated catalyst without the attendant disadvantages thereof. It should be noted that at similar silver concentrations, the impregnated cored catalyst of the invention showed substantially increased activity over the impregnated catalyst having a high porosity catalyst support.

While the invention has been described in connection with an impregnated cored catalyst for the preparation of ethylene oxide, it is to be understood that it is not intended to limit the invention thereto. The principles of the invention are susceptible of application with other impregnated cored catalysts for the preparation of products other than ethylene oxide.

From the above description it will be seen that improvements in performance of impregnated catalysts may be effected with a composite support having a low porosity core and a relatively higher porosity outer margin. Through the combination of limiting the percentage composition of catalyst material in the core structure in an amount up to approximately 10% of that outer margin, and proportioning the thickness of the outer margin to between 1/32" and 1/2", optimum catalytic effects may be obtained.

It will be understood that modifications and variations may be effected without departing from the spirit and scope of the invention.

I claim:

1. A supported catalyst which consists essentially of a silver catalyst and a catalyst support having (1) a metallic oxide outer margin having a thickness of 1/32" and 1/2" and a porosity of 15 to 40% and (2) a refractory core having a porosity of 0 to 10%, said catalyst being impregnated substantially only in said outer margin.

2. The catalyst of claim 1 wherein the outer margin is at least one of the compounds selected from the group consisting of silica, silicates, alumina and magnesia.

3. The catalyst of claim 1 wherein the refractory core is at least one of the compounds selected from the group consisting of alumina, silicon carbide and magnesium.

4. A supported catalyst consisting essentially of a silver catalyst and a support having an alumina outer margin having (1) a thickness between 1/32" and 1/2" and a porosity of 15 to 40% and (2) an alumina core having a porosity of 0 to 10%, wherein the silver is impregnated substantially in the outer margin and comprises from 5 to 15 wt. percent of the supported catalyst.

References Cited by the Examiner

UNITED STATES PATENTS

| | | | |
|---|---|---|---|
| 2,507,496 | 5/50 | Bond | 252—455 |
| 2,644,799 | 7/53 | Robinson | 252—463 |
| 2,742,437 | 4/56 | Houdry | 252—455 |
| 2,752,362 | 6/56 | Landau | 252—463 |
| 2,769,016 | 10/56 | Lichtenwalter et al. | 252—476 |
| 2,805,229 | 9/57 | Metzger | 252—476 |
| 2,901,411 | 8/59 | Waterman | 252—463 |

MAURICE A. BRINDISI, *Primary Examiner.*

JULIUS GREENWALD, *Examiner.*